Dec. 16, 1924.

E. J. ARMSTRONG

EXCAVATING DEVICE

Filed Jan. 14, 1924

1,519,101

Inventor
Edwin J. Armstrong
By
Attorney

Patented Dec. 16, 1924.

1,519,101

UNITED STATES PATENT OFFICE.

EDWIN J. ARMSTRONG, OF ERIE, PENNSYLVANIA, ASSIGNOR, BY DIRECT AND MESNE ASSIGNMENTS, TO ERIE STEAM SHOVEL COMPANY, OF ERIE, PENNSYLVANIA, A CORPORATION OF PENNSYLVANIA.

EXCAVATING DEVICE.

Application filed January 14, 1924. Serial No. 686,019.

*To all whom it may concern:*

Be it known that I, EDWIN J. ARMSTRONG, a citizen of the United States, residing at Erie, in the county of Erie and State of Pennsylvania, have invented new and useful Improvements in Excavating Devices, of which the following is a specification.

This invention is designed for improving the manner of securing points in excavating devices such as the points on a power shovel dipper. These points are subjected to very severe strain and wearing conditions and, therefore, are made of hard metal. The metal is such that it is not ordinarily practical to perfectly machine the shanks of the points and consequently great difficulty has been experienced in providing means for securing these points to the lip of the dipper or excavating device. I have accomplished this by providing a socket in which the shank of the point may be placed and placing a shim of comparatively soft metal along one wall of the socket so that this metal will take up the irregularities of the point shank and yield or flow sufficiently to make a perfect fit of the shank in the socket.

The invention is illustrated in the accompanying drawings as follows:—

Figure 1:
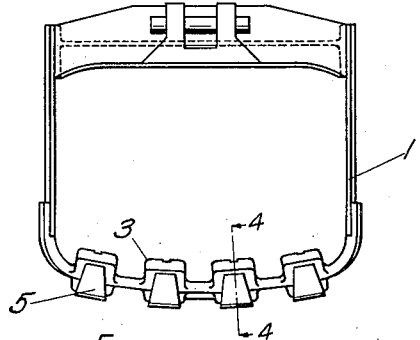
Figure 2:
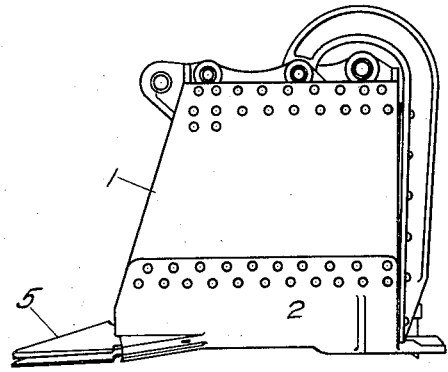
Figure 3:
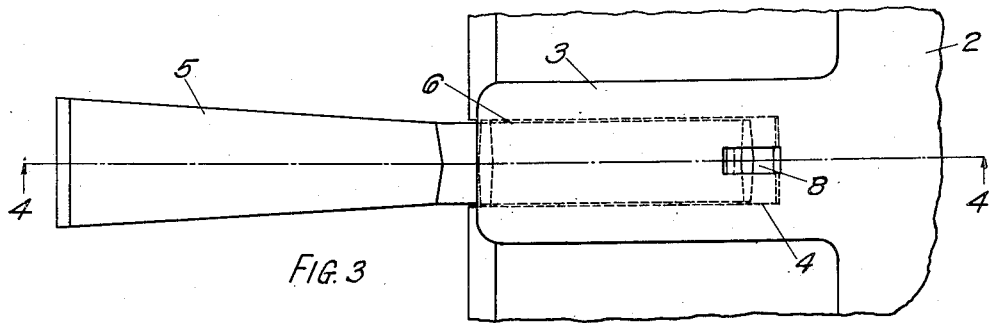
Figure 4:
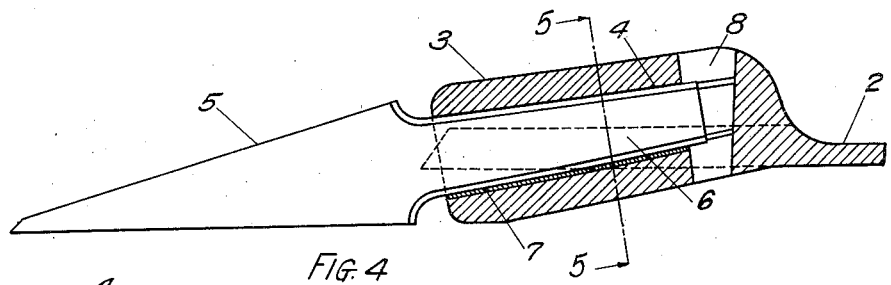
Figure 5:
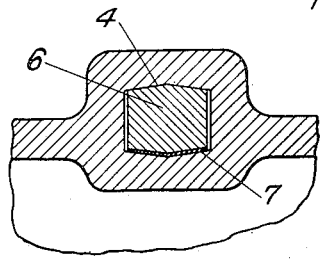

Fig. 1 shows a front view of the dipper.
Fig. 2 a side elevation of the same.
Fig. 3 an enlarged plan view of a portion of the lip with the point in place.
Fig. 4 a section on the line 4—4 in Fig. 3.
Fig. 5 a section on the line 5—5 in Fig. 4.

1 marks the dipper and 2 the bottom of the dipper which is provided with the dipper lip. The dipper lip has ribs 3 in which are arranged the tapered sockets 4.

Points 5 have shanks 6 which are tapered to conform to the shape of the socket 4.

A shim 7 of comparatively soft material is arranged between one wall of the socket and the shank and yields to make the shank conform to the socket and thus insures a tight fit between the shank and the walls of the socket.

In order that there may be no interference with a complete seating of the shank in the socket I prefer to make the shank somewhat narrower than the width of the socket and the top and bottom faces of the shank with angular surfaces so that the point is directioned and retained by these top and bottom walls in which the shim yields to make a perfect fit.

An opening 8 is provided at the rear of the socket in which a drift may be placed to expel the point from the socket.

What I claim as new is:—

1. In an excavating device, the combination of a point holder having a tapered socket therein; a point of comparatively hard metal having a tapered shank extending into the socket; and a shim of comparatively soft metal between the wall of the socket and the shank, said shim yielding to complete the fit of the shank in the socket.

2. In an excavating device, the combination of a point holder having a tapered socket therein; a point of comparatively hard metal having a tapered shank extending into the socket, the opposing faces and walls of the shank and socket being formed with angular surfaces; and a shim of comparatively soft metal between the angular surface walls of the socket and the shank.

3. In a dipper, the combination of a lip having a plurality of socket ribs thereon having tapered sockets therein; points having tapered shanks extending into the sockets, said points being of comparatively hard metal; and shims of comparatively soft metal between the walls of the sockets and the shanks.

In testimony whereof I have hereunto set my hand.

EDWIN J. ARMSTRONG.